Oct. 18, 1966 H. L. NEILSEN 3,279,470

CARD INDEX DEVICE

Filed April 16, 1964

INVENTOR:
HILDAUR L. NEILSEN
BY Robert Henderson
ATTORNEY 3,279,470
Patented Oct. 18, 1966

3,279,470

CARD INDEX DEVICE

Hildaur L. Neilsen, Metuchen, N.J., assignor to Zephyr American Corporation, Long Island City, N.Y., a corporation of New York Filed Apr. 16, 1964, Ser. No. 360,397
1 Claim. (Cl. 129—16)

This invention relates to card index devices and, more particularly, to such devices having means for holding index cards conveniently close to a perpendicular attitude with reference to the bottom of a body member such as a tray or channel on or within which they are carried.

Index cards may remain in an attitude substantially perpendicular to the bottom of the body member if they are numerous enough to tightly fill its length; but then it is difficult and, hence, very inconvenient to refer to or make entries on individual cards. If fewer cards are carried in the device to render the cards more accessible for reference, they tend strongly to sag and depart substantially from such a perpendicular attitude and, frequently, some cards slide at least partly underneath adjacent cards making it difficult for one to turn up a card to which reference is to be made.

The mentioned difficulty is somewhat ameliorated by the use of guide cards, which usually are somewhat stiffer than the index cards, to separate groups of the index cards. These guide cards, however, like the index cards, can slide with the index cards so that objectionable sagging and sliding of the cards is still encountered unless the device is objectionably tightly loaded.

Where the card stack is arcuate as in some card holders or where arcuate stacks are circular and rotatable, the bottoms of the cards are commonly notched to enable them to be removably attached to an arcuate or circular rail or rails. In such devices, the cards are commonly loose enough on the rails to permit adjacent cards to be spread apart to obtuse angular relationship to facilitate reference to the cards and entry of data thereon. Here again, however, the cards can slide along the rails and depart sufficiently from perpendicularity that it becomes difficult to observe the data at the top margins of the cards in riffling through them to locate the particular card to which reference is to be made. The latter condition derives little or no aid from the guide cards in the stack as they slide along the rails with the index cards.

According to the present invention, guide cards in the stack are so formed and so cooperate with the body portion of the device that they are prevented from sliding along the channel and consequently limit the sliding of index cards grouped between the guide cards. Thus, even though the index cards are quite loosely disposed in tray or channel, they stay in a substantially perpendicular attitude except when manually spread apart for reference or entry purposes.

A preferred embodiment of this invention is shown, for illustrative purposes, in the accompanying drawing without, however, limiting the invention to be illustrated circular, rotary index or to specific features of the illustrated device.

Figures 1, 2, 3, 4:
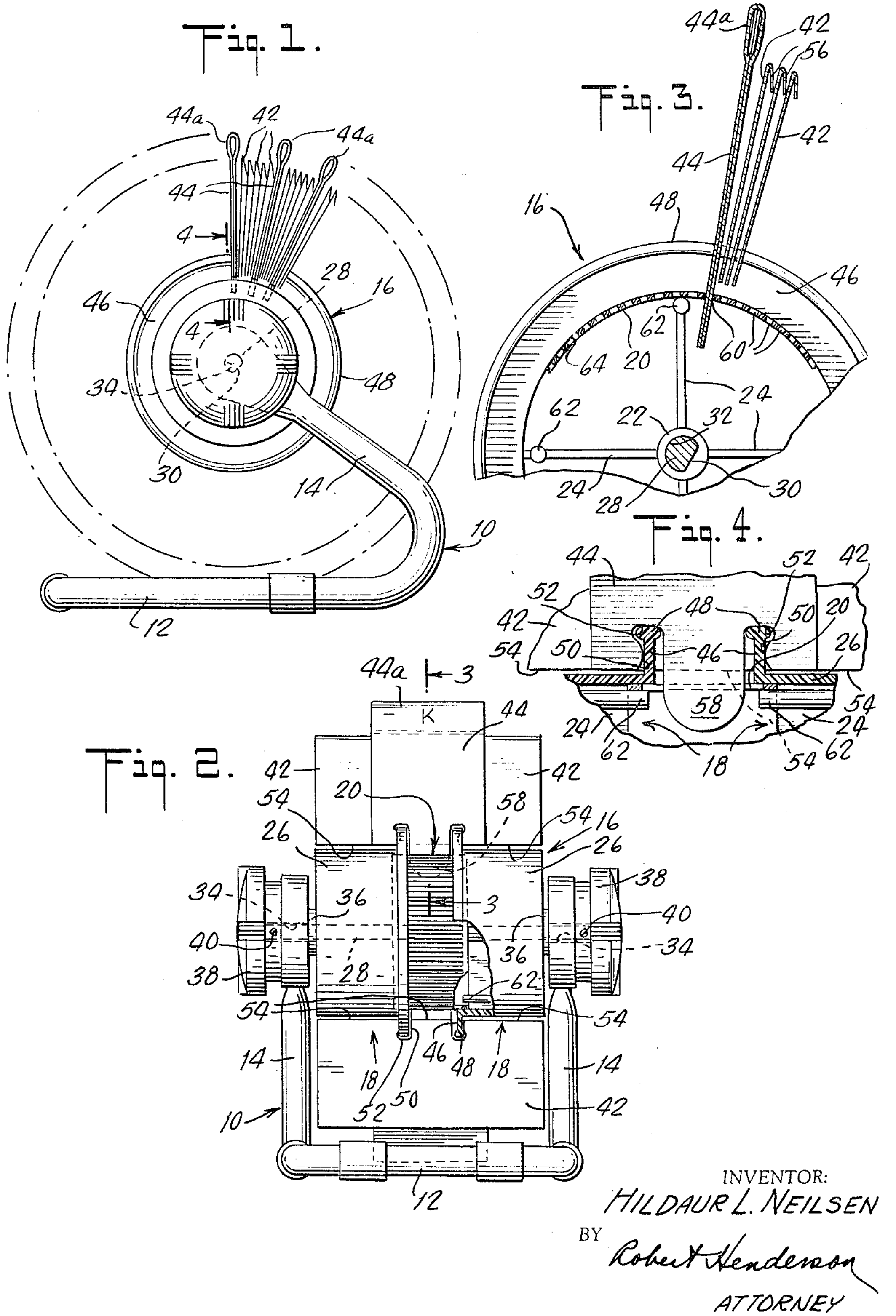
FIGURE 1 is a side elevational view of a rotary card index device according to this invention.
FIG. 2 is an end elevational view of the device, partly broken away to show some details thereof.
FIG. 3 is an enlarged, central, vertical sectional view substantially on the line 3—3 of FIG. 2.
FIG. 4 is an enlarged, fragmentary sectional view substantially on the line 4—4 of FIG. 1.

The illustrated device comprises a stand 10, preferably of metal tubing, bent to provide a base 12 from opposite sides of which similar, integral arms 14 extend upwardly to support a body member in the form of a rotor which serves as a circular, tray-like card holder 16.

The card holder 16 comprises a pair of similar, coaxially opposed wheels 18 spaced apart by a cylindrical separator 20, of sheet metal or other suitable sheet material. Each of the wheels, of plastic or other suitable material, is formed with a hub 22, spoke-like webs 24, integral with and radiating from the hub, and a cylindrical rim 26, integral with the outer ends of the spokes 24. A shaft 28, preferably of steel, having a flat 30 extending there-along is disposed within complementally shaped bores 32 in the hubs of the two wheels 18, and the ends of the shaft extend rotatably through bearing openings 34 in the two arms 14 of the stand.

Spacing washers 36 are disposed on the shaft 28 between the upper extremities of the arms 14 and the adjacent wheels 18, and suitably bored handwheels or knobs 38, of plastic or other suitable material, are fixed by setscrews 40 on the opposite ends of the shaft to facilitate manual turning of the shaft and the card holder.

To provide for attachment of index cards 42 and guide cards 44 to the card holder, the rim 26 of each wheel 18 is provided at its inner end with a radially outwardly extending, rigidly integral, circumferential rail 46 the outer periphery of which is broadened as at 48. The rails 46 extend into notches 50 provided similarly in both the index cards 42 and the guide cards 44, and the broadened rail portions 48 fit loosely but retentively within enlarged areas 52 of the cards' notches. Thus, with the disclosed card attachment arrangement, the index and guide cards may be attached or removed by suitable twisting at the notches 50, yet they are held securely upon the card holder in the absence of such twisting.

The index cards 42 in the device are of suitable heavy paper or lightweight cardboard or equivalent material suitable for having data written, printed, or typewritten thereon. Their bottom edges 54 are in spaced parallelism with and outside of the outer surfaces of the cylindrical portions of the rims 26 of the two heels 18 and of the separator 20, as best seen in FIGS. 2 and 4. The index cards may, as is commonly the case, be cards which are flat and without folds, i.e., single planar. On the other hand, as illustrated, their upper margins may be folded forwardly and downwardly as at 56 to extend at an acute angle, to space upper portions of adjacent cards from each other and render data on the index cards more readily visible.

With the card-attaching rail arrangement thus far described, however, the bottoms of the cards are relatively free to slide along the rail or rails; hence, the cards disadvantageously have a strong tendency to depart very substantially from a perpendicular attitude relatively to the rails.

The present invention enables the guide cards 44 to cooperate with the index cards 42 to oppose such sliding of the cards along the rails and such displacement of the cards from perpendicularity relative to the rails.

The guide cards 44 are illustrated (FIG. 2) as somewhat narrower than the index cards 42 but the relative width of the two kinds of cards has no bearing on this invention. They may be of the same width or, in some unusual cases, the guide cards may be even wider than the index cards.

The guide cards 44 have upwardly projecting indicia tabs **44*a***.

The bottom edges of the guide cards, outwardly of their notches 50, are approximately in circumferential alignment with the bottom edges 54 of the index cards. Between the notches 50, the guide card extends downwardly in the form of an integral, flat tongue 58 which extends through a transverse slot 60, an endless circumferential series of which are provided in the separator 20 in closely spaced relationship.

The slots 60 are uniformly and so closely spaced that guide cards 44 may be inserted in the device, with their tongues 58 in slots 60, at any point or points about the card holder 16 and in as great a number as would ever be required for the volume of index cards carried in the device.

As illustrated in FIG. 3, there are approximately 64 slots in the entire series and the spacing between successive slots is approximately equal to the width of one slot. Thus, the slots, from center to center, are spaced somewhat less than 6°, enabling a guide card to be disposed within 3° of any circumferential point of the separator 20. In use of the device, the just indicated spacing of the slots enables disposition of a guide card between any two successive non-tongued cards in tht stack of cards carried by the device; this being true because, in such use, the cards of the stack are slidable, at least slightly, along the rails 48. The guide cards should preferably be quite regularly distributed about the card holder and distribution, adequate for the purposes of this invention, ordinarily exists where their tabs 44*a* bear alphabetical indicia or other suitable indicia and are properly distributed in sufficient number to make such indicia effective for facilitating location of specific index cards in the device.

It will be realized that the tongues 58, extending into the slots 60 of the body member, restrain the guide cards 44 against sliding along the rails 46 and that successive guide cards, therefore, hold intervening index cards 42 against material sliding. While the tongues 58 of the guide cards fit freely into the slots 60, this fit is close enough that there is little tendency for them to depart materially from perpendicularity relatively to the rails. Moreover, the index cards between the guide cards tend to oppose material departures of the guide cards from a perpendicular attitude. Of course, both the guide cards and the index cards may be sufficiently flexible and the slots may be enough wider than the thickness of the guide cards to permit adequate spreading apart of adjacent cards where necessary for reference purposes.

Although numerous ways are available, within this invention, for forming a circular card holder with a card holding rail or rails and with the indicated series of slots 60, the illustrated card holder structure may be economically produced. To that end, the separator 20 is formed of a strip of sheet metal, suitably cross-slotted to provide the slots 60. This strip, of a length corresponding approximately to the circumferential length of the rim 26 at the latter's inside surface, is bent into cylindrical shape and seated (FIG. 4) so that its opposite side margins project within the rim 26 of the two opposed wheels 18 and abut the opposed inner edges of webs 24 of the two said wheels.

The webs 24 are formed with axially extending lugs 62 which extend within the opposite side margins of the separator 20 to hold the latter against collapsing inwardly. The ends of the metal strip, of which the separator is formed, abut as at 64 (FIG. 3); or they may slightly overlap at that point.

The separator 20 is held in place by reason of the two wheels 18 being urged toward each other by the stand's arms 14 being somewhat resilient and being stressed inwardly on the shaft 28 and/or by the handwheels 38 which hold all parts associated with said shaft against material displacement therealong.

Those familiar with devices of the general type disclosed herein will understand that the presently disclosed concepts may be utilized in various other ways without departing from this invention as set forth in the following claim.

I claim:

A rotary card holder, for a card index device, comprising a rotary shaft, a pair of opposed, generally cylindrical wheels carried coaxially upon said shaft for rotation therewith and formed with uninterrupted, circumferentially extending card-holding rails integral with their peripheries; a cylindrical separator of readily bendable sheet material formed with a continuous, circumferential series of similar, uniformly and closely spaced, axially extending slots for the reception of tongues of tongued cards therein, the separator being disposed between and coaxially of said wheels; and means on said shaft holding the two wheels in abutting engagement with opposite sides of the separator; said wheels having coaxial portions intimately overlying opposite side marginal portions of the separator to hold the latter in cylindrical form and in coaxial relation to the wheels and also having axially extending portions at plural circumferential points of the wheels, spaced radially inwardly of the said coaxial portions of the wheels and extending intimately against inner surfaces of said opposite side marginal portions of the separator to oppose inward collapsing of the latter.

References Cited by the Examiner

UNITED STATES PATENTS

| | | | |
|---|---|---|---|
| 1,976,249 | 10/1934 | Stafford | 129—16 |
| 2,169,562 | 8/1939 | Lombardini | 129—16 |
| 2,389,923 | 11/1945 | Miller | 129—16 |
| 2,703,744 | 3/1955 | Karper | 129—16 |

FOREIGN PATENTS

| | | |
|---|---|---|
| 511,346 | 3/1955 | Canada. |
| 675,662 | 10/1963 | Canada. |
| 106,392 | 5/1917 | Great Britain. |
| 827,915 | 2/1960 | Great Britain. |

JEROME SCHNALL, *Primary Examiner.*